US 9,470,134 B2

(12) United States Patent
Hirukawa

(10) Patent No.: US 9,470,134 B2
(45) Date of Patent: Oct. 18, 2016

(54) MUFFLER MOUNT STRUCTURE

(71) Applicant: HONDA MOTOR CO., LTD., Tokyo (JP)

(72) Inventor: Masayuki Hirukawa, Dublin, OH (US)

(73) Assignee: HONDA MOTOR CO., LTD, Tokyo (JP)

( * ) Notice: Subject to any disclaimer, the term of this patent is extended or adjusted under 35 U.S.C. 154(b) by 166 days.

(21) Appl. No.: 14/255,521

(22) Filed: Apr. 17, 2014

(65) Prior Publication Data

US 2015/0300234 A1    Oct. 22, 2015

(51) Int. Cl.
*B60K 13/04* (2006.01)
*F01N 13/18* (2010.01)

(52) U.S. Cl.
CPC ........... *F01N 13/1805* (2013.01); *B60K 13/04* (2013.01); *B60Y 2200/86* (2013.01)

(58) Field of Classification Search
CPC ............... B60K 13/04; F01N 13/1822; F01N 13/1805; F01N 13/1811
See application file for complete search history.

(56) References Cited

U.S. PATENT DOCUMENTS

| | | | | |
|---|---|---|---|---|
| 3,851,673 A | * | 12/1974 | Merkle | F16L 3/00 138/106 |
| 3,942,599 A | * | 3/1976 | Shimada | B60K 13/04 180/292 |
| 4,116,411 A | * | 9/1978 | Masuda | F16L 3/16 180/89.2 |
| 4,349,078 A | * | 9/1982 | Shimada | F01N 13/1822 180/69.1 |
| 4,638,965 A | * | 1/1987 | De Bruine | F01N 13/1822 180/89.2 |
| 4,727,957 A | | 3/1988 | Fujita | |

(Continued)

FOREIGN PATENT DOCUMENTS

| | | |
|---|---|---|
| JP | 6-328954 | 11/1994 |
| JP | 201376329 | 4/2013 |

*Primary Examiner* — Katy M Ebner
(74) *Attorney, Agent, or Firm* — Kenealy Vaidya LLP

(57) ABSTRACT

An off road type vehicle exhaust system including a muffler, a mounting bracket and a vibration insulator. The vibration insulator connects the muffler to the vehicle. The mounting bracket connects the muffler to the vibration insulator and includes a rod attached to the muffler and configured to mate with the vibration insulator and a heat shield having a first end secured to the muffler and a second end engaging the vibration insulator. The rod has a first portion secured to an outer surface of the muffler, a first bend, a second portion extending away from the muffler, a second bend, and a third portion which is at least generally parallel to a longitudinal axis of the muffler. The heat shield includes a muffler engaging section and a vibration insulator engaging section. The vibration insulator engaging section includes a first wall extending from the muffler engaging section, a bend, and a second wall opposed to the first wall. The second wall also includes an opening through which the rod passes.

19 Claims, 6 Drawing Sheets

(56) References Cited

U.S. PATENT DOCUMENTS

| | | | | |
|---|---|---|---|---|
| 4,757,872 A * | 7/1988 | Inomata | B60K 11/06 | 180/215 |
| 5,445,241 A * | 8/1995 | Nakamura | B60K 13/04 | 180/296 |
| 5,496,069 A * | 3/1996 | Milligan | B60K 15/03 | 252/62 |
| 5,507,463 A * | 4/1996 | Kobylinski | B60K 13/04 | 248/610 |
| 5,542,707 A * | 8/1996 | Kamei | B60K 13/04 | 280/781 |
| 5,890,685 A * | 4/1999 | Takahashi | B60K 13/04 | 248/74.1 |
| 6,058,702 A * | 5/2000 | Jorg Alexnat | B60K 13/04 | 60/322 |
| 6,120,011 A * | 9/2000 | Maeno | B60K 5/1291 | 267/140 |
| 6,402,119 B1 * | 6/2002 | Miska | F01N 13/1822 | 248/58 |
| 6,536,548 B2 * | 3/2003 | Steenackers | B60K 13/04 | 180/296 |
| 6,640,927 B1 * | 11/2003 | Turner | B60K 13/04 | 180/89.2 |
| 6,758,300 B2 * | 7/2004 | Kromis | B60K 13/04 | 180/296 |
| 6,851,506 B2 * | 2/2005 | Bovio | B60K 13/04 | 180/296 |
| 6,854,561 B2 * | 2/2005 | Bass | B60K 13/04 | 180/309 |
| 6,988,579 B2 | 1/2006 | Miyahara | | |
| 7,165,645 B2 * | 1/2007 | Chae | F01N 13/1822 | 180/309 |
| 7,510,043 B2 * | 3/2009 | Cerri, III | B60K 13/04 | 180/296 |
| 7,931,119 B2 * | 4/2011 | Fujita | B60K 13/04 | 180/309 |
| 8,052,175 B2 * | 11/2011 | Yamaguchi | B60K 13/04 | 285/147.1 |
| 8,152,146 B2 * | 4/2012 | Rodecker | F16F 1/3849 | 180/296 |
| 8,376,331 B2 * | 2/2013 | Rodecker | F01N 13/1811 | 180/296 |
| 8,430,198 B2 * | 4/2013 | Orihashi | B62K 5/01 | 180/296 |
| 8,608,117 B2 * | 12/2013 | Rodecker | F01N 13/1805 | 248/58 |
| 8,690,115 B2 * | 4/2014 | Rodecker | F01N 13/1822 | 248/617 |
| 8,813,900 B2 * | 8/2014 | Poulin | B60K 5/00 | 180/309 |
| 8,926,726 B2 * | 1/2015 | Mitsuda | F01N 13/00 | 422/169 |
| 9,050,887 B2 * | 6/2015 | Takahashi | B60K 13/04 | 248/58 |
| 2005/0184201 A1 * | 8/2005 | Komitsu | B60K 13/04 | 248/58 |
| 2006/0042856 A1 * | 3/2006 | Kim | F01N 13/1822 | 180/296 |
| 2008/0163613 A1 * | 7/2008 | Mabuchi | B60K 13/04 | 60/299 |
| 2009/0230601 A1 * | 9/2009 | Lenda | F16F 1/371 | 267/141.1 |
| 2011/0240827 A1 * | 10/2011 | Malloy | F01N 13/1822 | 248/636 |
| 2011/0287231 A1 * | 11/2011 | Taylor | B60K 5/1233 | 428/188 |
| 2013/0038090 A1 | 2/2013 | Hwang et al. | | |
| 2014/0174581 A1 * | 6/2014 | Shimomura | B60K 13/04 | 138/103 |

* cited by examiner

MUFFLER MOUNT STRUCTURE

BACKGROUND

The present exemplary embodiment relates to a muffler mount structure. It finds particular application in conjunction with off road type of vehicles and will be described with particular reference thereto. However, it is to be appreciated that the present exemplary embodiment is also amenable to other like applications.

The present exemplary embodiment relates to an exhaust system for a motor vehicle, and particularly to support for a vehicle muffler. It finds particular application in conjunction with off road type of vehicles, such as an all-terrain vehicle (hereinafter referred to as "ATV"), a multi-use vehicle (hereinafter referred to as "MUV"), and a side-by side vehicle (hereinafter referred to as "SxS") and will be described with particular reference thereto. However, it is to be appreciated that the present exemplary embodiment is also amenable to other types of vehicles and applications.

Typically, automotive vehicles including cars, trucks and off road types have an internal combustion engine which is coupled to at least a transmission for providing power to the drive wheels of the vehicle. An engine exhaust system which typically includes an exhaust pipe, a catalytic converter and a muffler is attached to the engine to quiet the combustion process, to clean the exhaust gases and to route the products of combustion away from the engine to a desired position typically at the rear of the vehicle.

As motorists drive their vehicles over roads and/or off road, they encounter potholes, bumps and other uneven surfaces that shake and jolt the vehicle body. These vibrations and jarring shocks to the vehicle body may cause damage to various components and connections. One of the systems of the vehicle that may be damaged by such vibrations is the exhaust system. The vibrations may cause cracks in the welds between components of the system. The exhaust system is supported by exhaust mounts which are positioned between the exhaust system and the frame or some other supporting structure of the vehicle body. In order to prevent exhaust system vibrations from being transmitted to the car body and vice versa, the exhaust mounts incorporate flexible members or elastic suspension members to isolate the vehicles exhaust system from the vehicles body.

Exhaust mounts have included rubber isolators which are a solid rubber component or a puck which is provided with at least one pair of apertures extending there through. The apertures each receive an elongated metal stud. The metal stud is provided with an enlarged tapered head that can be forced through the aperture in the isolator, but it cannot be readily removed from the isolator. The opposite end of the stud is welded to or otherwise secured to either a support point in the vehicle or to one of the components of the exhaust system.

The two metal studs are inserted at opposite ends of the elastomer and the loads inflict tension on the isolator puck connecting both ends. While this is typically the lowest cost design, it is also the most abusive to the material. Furthermore, the high temperature environment in which the isolator operates can cause degradation of the elastomeric material. This can be particularly true with respect to off road types of vehicles which may have exhaust systems that operate at temperatures above standard passenger vehicles.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, a vehicle having a body frame including a front frame portion, a center frame portion, and a rear frame portion is provided. The front frame portion supports a front-wheel drive system. The center frame portion provides a space for occupants. The rear frame portion supports a rear-wheel drive system. A pair of occupant seats, including a driver's seat and a passenger seat, is disposed side by side in a vehicle width direction in the center frame portion. An internal combustion engine is disposed behind the occupant seats in the rear frame portion. An exhaust pipe is connected to the internal combustion engine behind the occupant seats. A combustion gas generated by combustion in the internal combustion engine is exhausted through a muffler connected to the exhaust pipe. The muffler is supported by the rear frame portion. The muffler is attached to the rear frame portion by a mounting structure comprising an elastomeric element conformed to receive a portion of the rear frame, and a rod attached to the muffler and configured to mate with the elastomeric element and hangingly support the muffler. A bracket having a first end secured to the muffler and a second end facing the elastomeric element provides vibration dampening and heat shielding.

According to a second embodiment, a vehicle exhaust system including a muffler, a mounting bracket and a vibration insulator is provided. The vibration insulator connects the muffler to the vehicle. The mounting bracket connects the muffler to the vibration insulator and includes a rod attached to the muffler and configured to mate with the vibration insulator and a heat shield having a first end secured to the muffler and a second end engaging the vibration insulator. The rod has a first portion secured to an outer surface of the muffler, a first bend, a second portion extending away from the muffler, a second bend, and a third portion which is at least generally parallel to a longitudinal axis of the muffler. The heat shield includes a muffler engaging section and a vibration insulator engaging section. The vibration insulator engaging section includes a first wall extending from the muffler engaging section, a bend, and a second wall opposed to the first wall. The second wall also includes an opening through which the rod passes.

According to a further embodiment, an exhaust system heat shield is provided. The heat shield is constructed of a body including a first curved portion, a second substantially planar intermediate portion, a corner providing a bend of at least 120°, and a third substantially planar heat shield portion, wherein the intermediate portion faces the heat shield portion.

DETAILED DESCRIPTION

The embodiments will now be described with reference to the accompanying drawings.

Figure 1:
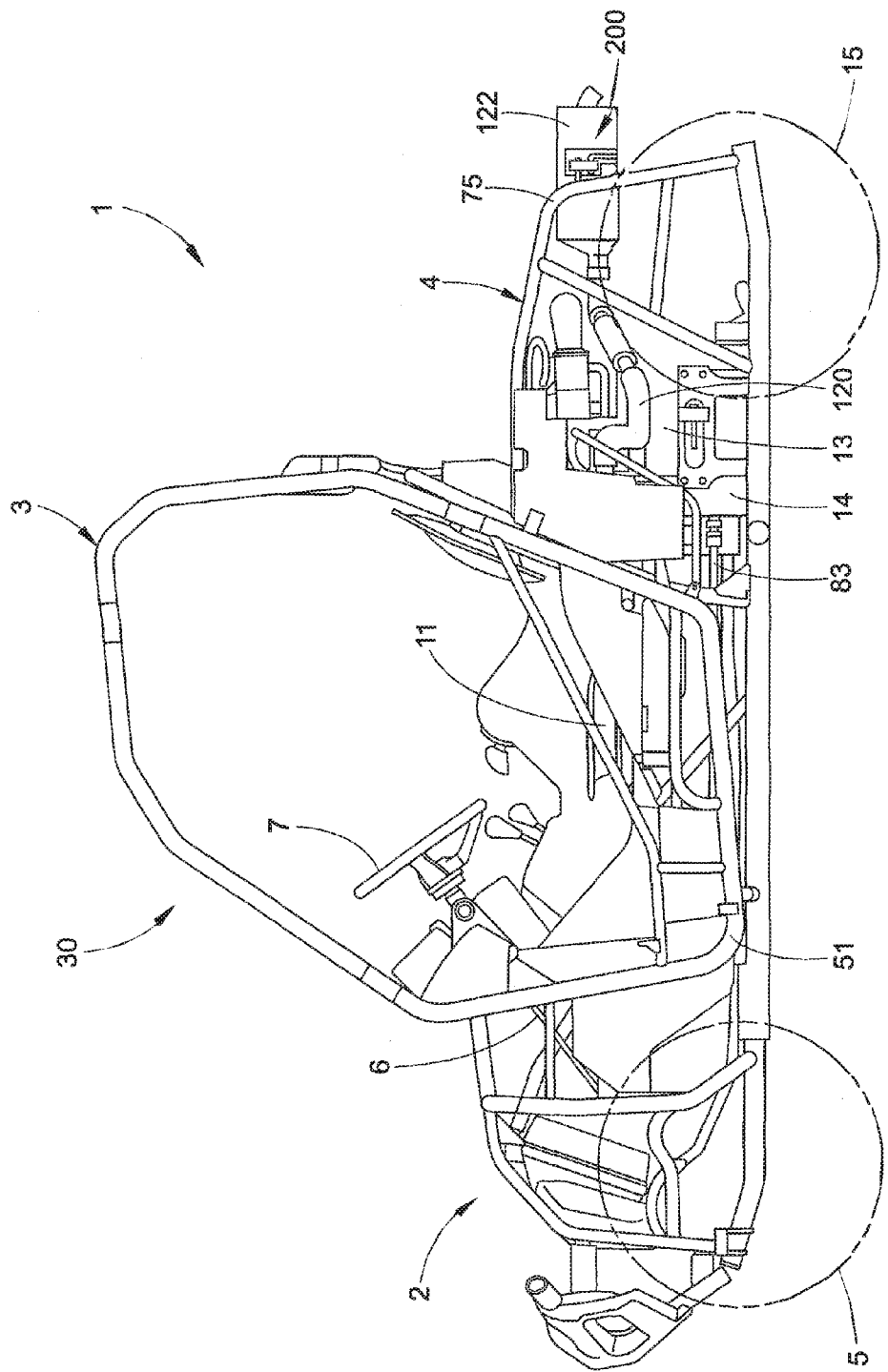
FIG. 1 is a plan view of a vehicle including a muffler mount according to an embodiment of the present disclosure.
Figure 2:
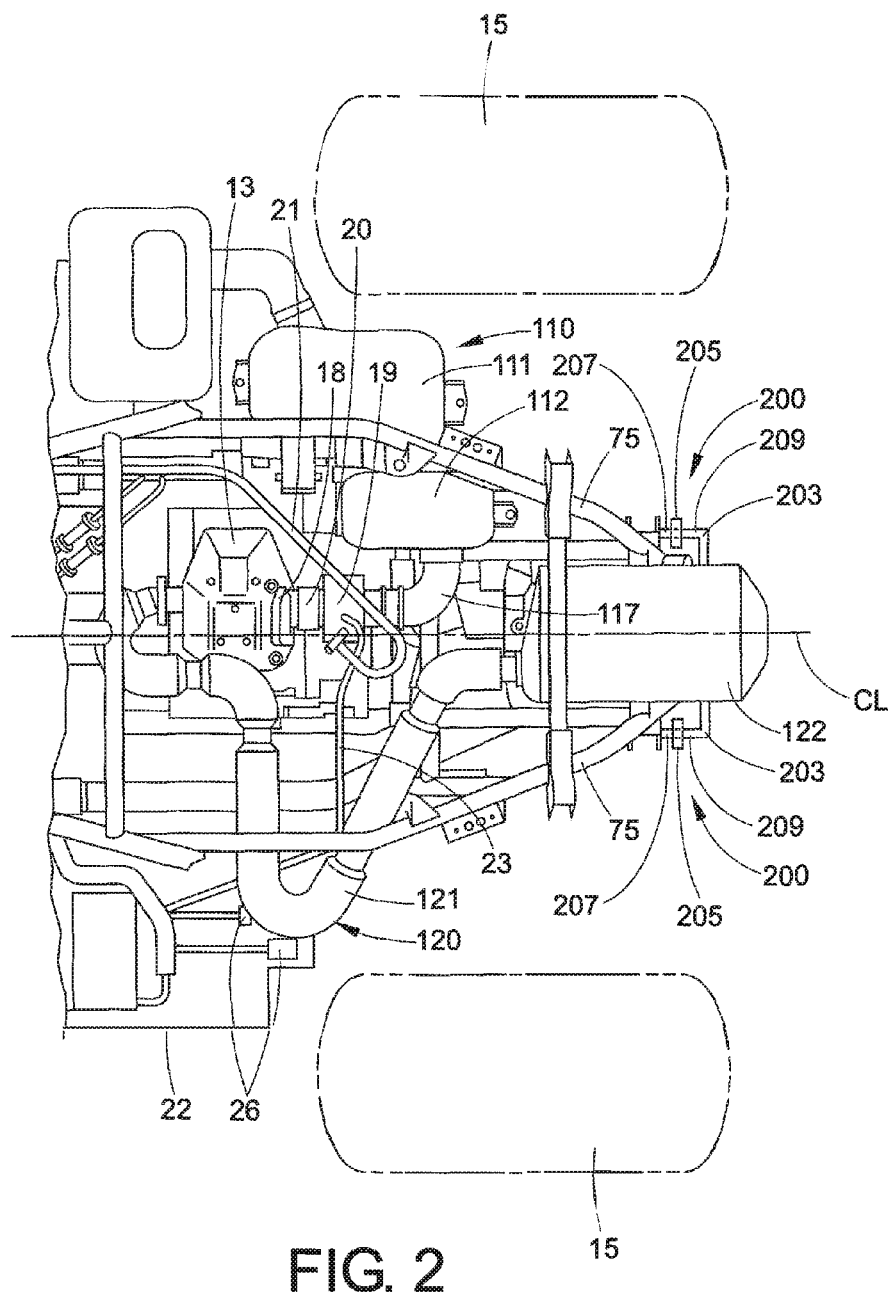
FIG. 2 is a plan view of is an enlarged area of the rear elements of FIG. 1.
Figure 3:
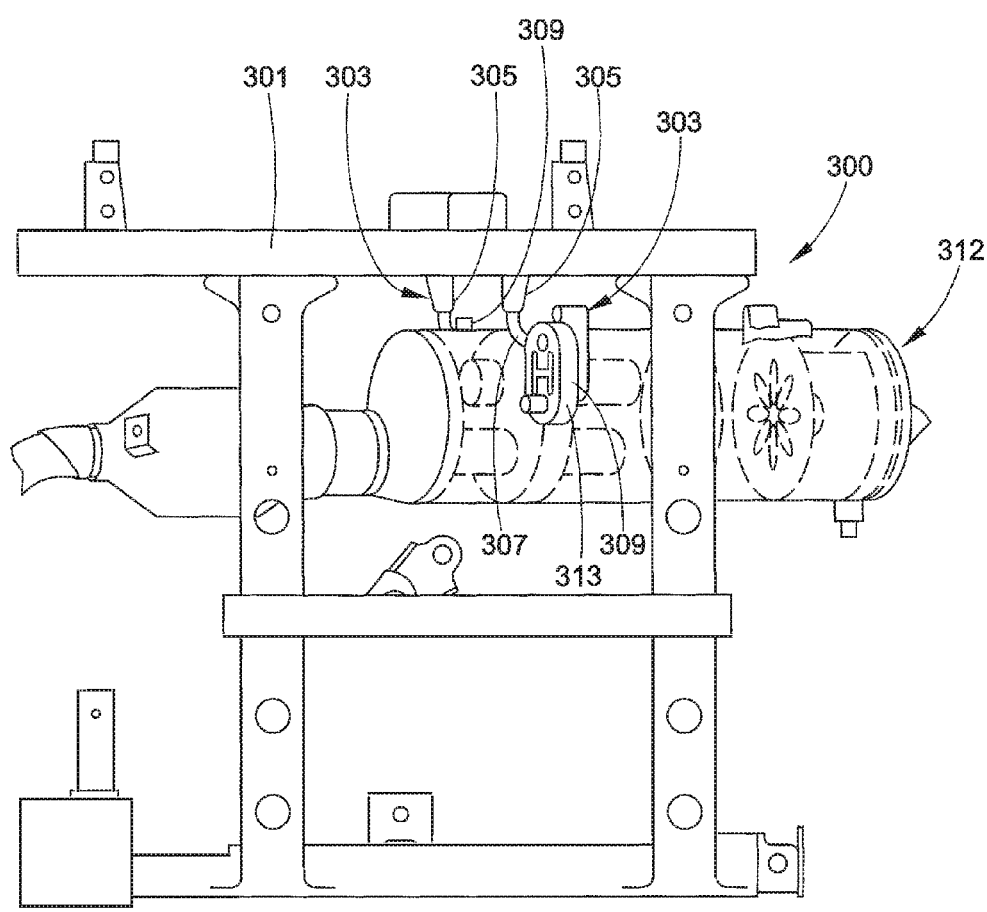
FIG. 3 is a side elevation view of an alternative muffler mounting configuration.

As illustrated in FIGS. 1 and 2, a vehicle 1 according to a first embodiment includes a vehicle body frame 30 which includes a front frame portion 2, a center frame portion 3, and a rear frame portion 4 so as to constitute a vehicle body B. A front-wheel suspension system (not illustrated) which suspends left and right front wheels 5 is attached to the front frame portion 2. In addition, a front-wheel drive system (not illustrated) including a front differential gear unit, front drive shafts, and the like; steering members (including a steering shaft 6 and a steering wheel 7 attached to an upper end of the steering shaft 6) for steering the front wheels 5; and the like are supported on the front frame portion 2.

A pair of occupant seats 11, constituting a driver's seat and a passenger seat arranged side by side in a vehicle width direction are attached to the center frame portion 3, so that a space for occupants is formed. A front propeller shaft 83 couples a power unit P and the front differential gear unit and is disposed between the driver's seat and the passenger seat.

A rear-wheel suspension system (not illustrated) which suspends left and right rear wheels 15 is attached to the rear frame portion 4. In addition, a rear-wheel drive system (not illustrated) including, for example, a rear propeller shaft, a rear differential gear unit, rear drive shafts; and the like are supported on the rear frame portion 4 in addition to the power unit P including an internal combustion engine 13 and a transmission 14.

With specific reference to FIG. 2, a throttle valve unit 19 is connected to a rear portion of a cylinder head 18 of the internal combustion engine 13 via an intake manifold 20. An exhaust pipe 120 is connected to a front portion of the cylinder head 18. An air cleaner 110 including first and second air cleaner chambers 111 and 112, is connected to a rear portion of the throttle valve unit 19 via a connecting tube 117. A fuel supply pipe 21 and a wire harness 23 are connected to the throttle valve unit 19. The fuel supply pipe 21 extends from a fuel tank (not illustrated). The wire harness 23 is arranged to extend from a battery housed in a battery case 22 to an ECU 26, and the like.

The exhaust pipe 120 connected to the front portion of the cylinder head 18 first extends frontward, thereafter turns around and extends rearward, is further bent at substantially 90°, and rectilinearly extends to the outside of the vehicle body while being inclined downward with respect to a horizontal plane. Moreover, after reaching a region behind the driver's seat 11 in the vehicle width direction, the exhaust pipe 120 is bent to the inside of the vehicle body and linearly extends back substantially onto the center line CL of the vehicle body while being inclined upward, and is then connected to a muffler 122 disposed to extend generally in a front-rear direction of the vehicle body in the rear frame portion 4.

The outermost extending portion 121 of the exhaust pipe 120 extends to the region inside the rearward extension line of the corresponding side frame 51 in the vehicle width direction and outside the corresponding rear upper frame 75 in the vehicle width direction. With this arrangement, the exhaust pipe 120 is protected while the length of the exhaust pipe 120 is sufficiently secured.

Muffler 122 is secured to the vehicle rear upper frame 75 via mounting structures 200. Each of mounting structure 200 includes a rod 203 secured to the muffler 122 at a first end and attached to an elastomeric isolator 205 at a second end. The elastomeric isolator 205 is in turn secured to a post 207 extending from the rear upper frame 75. A bracket element 209 extends between the muffler 122 and the elastomeric isolator 205 to provide heat shielding and vibration dampening.

Referring now to FIGS. 3-6, exhaust system 300 is mounted to vehicle frame 301 by a pair of mounting structures 303. The mounting structures 303 include a frame post 305 depending from the vehicle frame 301. The frame post includes a tip element 307 which receives an elastomeric isolator 309. Elastomeric isolator 309 includes a first passage 311 configured to receive the tip element 307 of the frame post 305.

Muffler 312 is provided with a pair of muffler rods 313 having a first end 315 secured to an outer surface 317 of the muffler 312. First end 315 of muffler rod 313 can be secured to the muffler outer surface 317 in any manner known to the skilled artisan such as welding, bolting or as an integrally formed metal component. The first end 315 of the muffler rod 313 can include a shape configured to match the outer surface 317 of the muffler 312. The muffler rod 313 can include a first bend 319 oriented away from the muffler 312 which provides a region 321 of the rod 313 which extends horizontally away from the muffler 312. A second bend 323 is oriented in a direction to provide the rod 313 with a terminal portion 325 lying generally parallel to a longitudinal axis of the muffler 312. The terminal portion 325 of the rod 313 is received within a passage 329 formed in elastomeric isolator 309.

The elastomeric isolator may be manufactured in any shape or configuration desired to provide an element allowing the muffler 313 to be elastomerically suspended from the vehicle frame. The isolator can be manufactured from an elastomer such as EPDM. Since the elastomeric isolator can be soft and flexible it can be easily snapped into position over the post and/or rod. EPDM is able to withstand temperatures ranging from 210 to 250 degrees Fahrenheit and is flexible enough to dampen vibrations. A suitable lock such as a flange 328 may be provided on the head of the terminal portion 325 of the rod to form a locking relationship with the passage in the elastomeric isolator. A pin, a cap, or other types of known elements that can prevent the elastomeric isolator from sliding off either the rod 313 or the frame post 305 are also acceptable. In another embodiment, the elastomeric isolator may be frictionally held in place.

Figure 4:
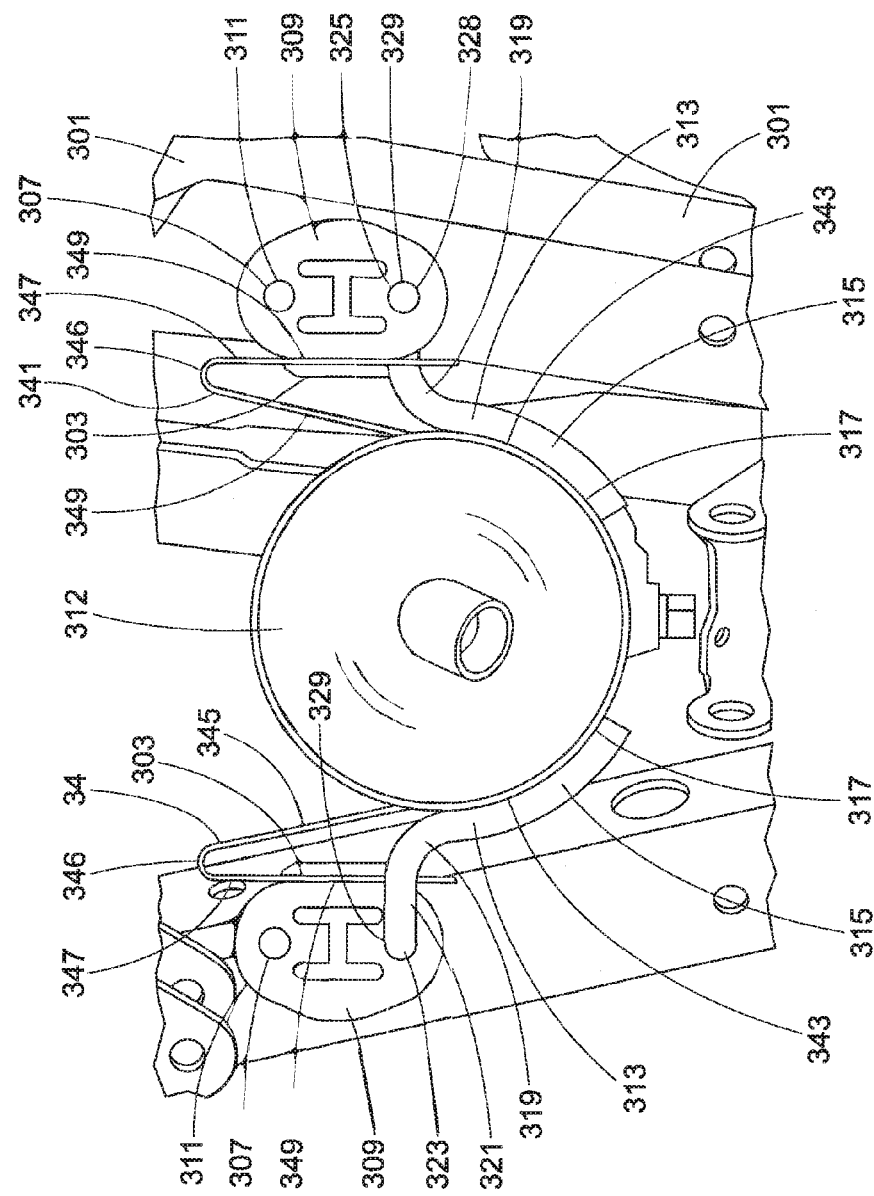
FIG. 4 is an end view of the muffler of FIG. 3.
Figure 5:
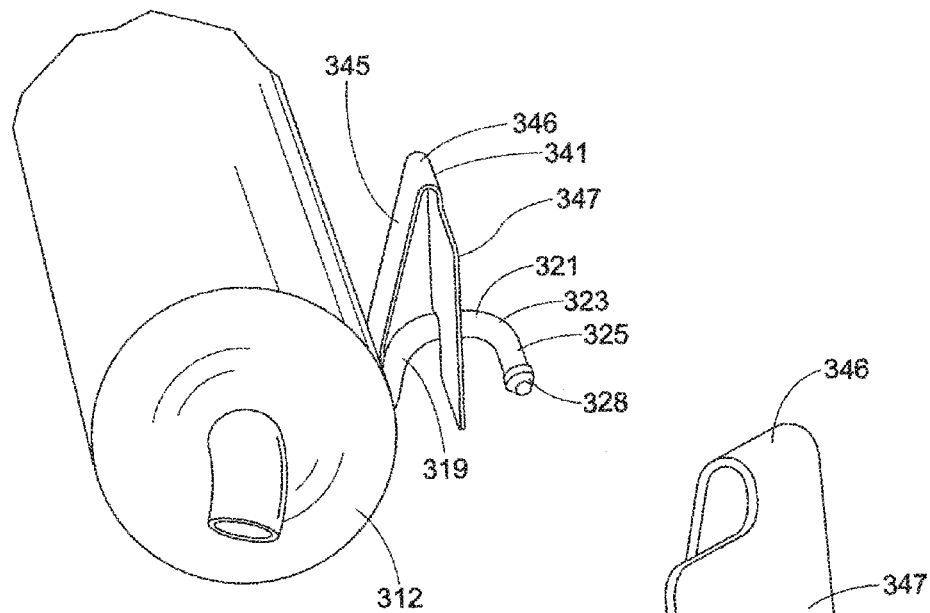
FIG. 5 is a perspective view of the muffler of FIG. 3 isolated from the support frame.
Figure 6:
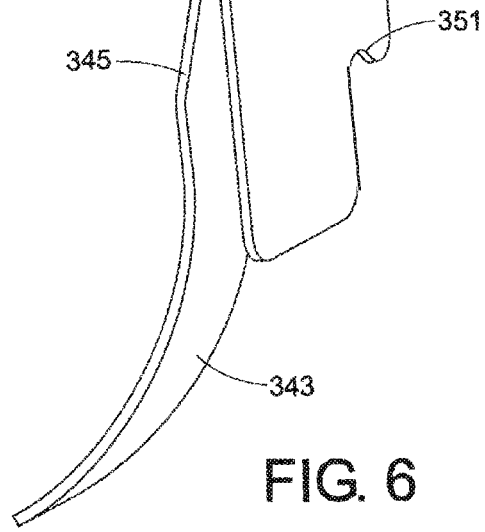
FIG. 6 is a perspective view of the bracket heat shield.

With reference to FIG. 4, it is noted that the muffler 312 can attached to vehicle frame 301 via a pair of rods 313 extending from opposed sides of the muffler 312. In the depicted embodiment, each of the bends 323 (only the left side bend is visible) is in opposed directions. Although rods are shown as originating from approximately the same position along the length of the muffler, it is envisioned that certain embodiments may benefit from a first rod being disposed at one end of the muffler and a second rod being disposed at a second end of the muffler.

Also disposed between the muffler 312 and the elastomeric isolator 309 is a bracket element 341. Bracket element 341 includes a first region 343 configured to mate to the outer surface 317 of the muffler 312. In that regard, it may be desirable for the muffler engaging section to have a shape complimentary to an outer surface of the muffler. A first, at least generally planar region 345 of bracket element extends generally upward and above the muffler 312. Region 345 flows into a corner 346 providing a bend in the bracket member 341 which flows into a second at least generally planar region 347. Planar region 347 can engage a side wall 349 of the elastomeric isolator 309. Generally, the corner 346 will comprise a bend in the bracket of at least 120°. In certain embodiments, it may be beneficial that the bend is configured to provide second planar region 347 with an at least substantially vertical orientation. Accordingly, the portion of the bracket engaging the elastomeric isolator can comprise a generally "V" shaped portion.

Bracket member 341 provides the further advantageous reduction in vibration experienced by the muffler 312. Moreover, bracket 341 engages the elastomeric isolator to reduce lateral motion of the muffler 312. In addition, bracket 341 forms a heat shield between the muffler 312 and the elastomeric isolator 309 which can otherwise be degraded by the high temperatures of the muffler 312. Positioning heat shield bracket 341 over the elastomeric isolator allows for an EPDM to be selected based on superior strength and structural properties as opposed to a primary concern with heat resistance.

Figure 7:
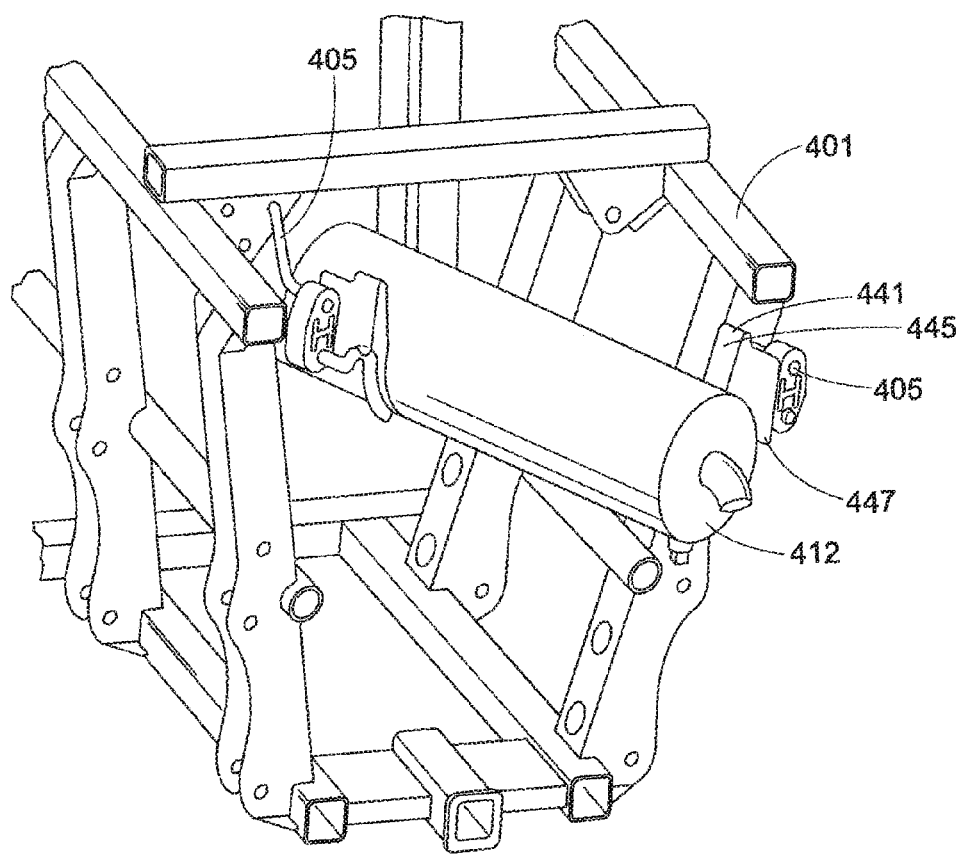
FIG. 7 is a perspective view of an alternative muffler mounting configuration.

As seen particularly clearly in FIG. 7, the elastomeric isolator engaging wall 447 of the bracket 441 may have a width greater than the width of the intermediate wall 445 which extends from the muffler engaging region. In this manner, particularly effective heat shielding is achieved while the overall weight of the bracket is kept to a minimum and its flexibility (resiliency) maximized. Of course, the elastomeric isolator engaging wall (i.e. the heat shield wall) and the intermediate wall between the muffler engaging region and the elastomeric isolator engaging wall may take a variety of configurations without departing from the spirit of the present invention.

The bracket may be manufactured from a silicone elastomer, fluoro-elastomer, ethylene acrylic, suitable metals, fabric, and any other suitable material.

In the depicted embodiment, the muffler engaging portion of the rod overlaps the muffler engaging portion of the bracket. In that configuration, the elastomeric isolator engaging wall of the bracket may be provided with an opening such as notch 351 to facilitate the passage of the muffler rod there through.

Muffler rod 313 and bracket 341 can be formed as an integral structure or separately configured. Similarly, either element can be formed as an integral component of the muffler. In addition, although the pair of brackets is depicted as being disposed in substantially the same position along the length of the muffler, it is noted that positioning of the mounting structures at varied positions along the length of the muffler is also contemplated. Similarly, although only a single pair of mounting structures is depicted, it is envisioned that multiple pairs or even odd numbers of mounting structures may be employed as necessary.

Turning now again to FIG. 7, the adaptability of the present mounting structures as depicted. Particularly, muffler 412 can be retained in any orientation relative to a center line of the vehicle frame 401 as desired by the skilled artisan. More particularly, in this embodiment, the frame 401 is relatively wide and by providing frame posts 405 on opposed sides of the frame 401, and angled relative to a centerline of the frame 401 the muffler 412 is oriented at angle to a centerline of the frame/vehicle. This design feature is advantageous in that exhaust systems have become progressively more complicated, with more apparatus being arranged in increasingly compact space (particularly in a ATV, MUV, and/or SxS). Allowing for the angularity of the muffler to be easily adjusted provides increased flexibility for a design engineer.

It is also noted that although the present description has been focused on securing the vehicle muffler to the frame, a number of exhaust system component exist. For example most vehicles include a catalytic converter which is connected to a manifold by a pipe section and to a muffler by a pipe section. The muffler itself may be connected to a tail pipe. The present disclosure contemplates that each of these various components of an exhaust system may be supported with the mounting structure of the present description.

The mounting structure of the present description advantageously performs thermal insulation of the elastic part that supports exhaust system components. The mounting structure also provides lateral position stability of the exhaust system components. These features improve the durability of the elastic parts, improve the durability of the exhaust system, reduce of vehicle noise, and increase design freedom with respect to the exhaust system components of the vehicle.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle comprising a vehicle body frame, the vehicle body frame comprising a front frame portion, a center frame portion, and a rear frame portion, the front frame portion supporting a front-wheel drive system, the center frame portion providing a space for occupants, the rear frame portion supporting a rear-wheel drive system; a pair of occupant seats comprising a driver's seat and a passenger seat disposed side by side in a vehicle width direction in the center frame portion; an internal combustion engine disposed behind the occupant seats in the rear frame portion; an exhaust pipe which is connected to the internal combustion engine behind the occupant seats and through which a combustion gas generated by combustion in the internal combustion engine is exhausted; and a muffler connected to the exhaust pipe, the muffler being supported by the rear frame portion, wherein the muffler is attached to the rear frame portion by a mounting structure, the mounting structure comprising an elastomeric element configured to receive a portion of said rear frame, a unitary rod formed to be of a single body, the rod being attached to said muffler and configured to mate with said elastomeric element, and a bracket having a first end secured to said muffler and a second end in a facing orientation relative to said elastomeric element, wherein the rod includes a first portion shaped complimentary to an outer surface of the muffler, a first bend, a second portion extending away from the muffler, a second bend, and a third portion which is at least generally parallel to a longitudinal axis of the muffler, wherein the elastomeric element defines a pair of holes spaced apart in a first direction, and the elastomeric element has a first length dimension measured in the first direction, and wherein the second end of the bracket has a second length dimension measured in the first direction that is greater than the first dimension.

2. The vehicle of claim 1 wherein the second end of the bracket forms a heat shield for said elastomeric element.

3. The vehicle of claim 1 wherein the elastomeric element is formed of rubber.

4. The vehicle of claim 1, wherein the vehicle further comprises at least two sets including at least one each of the rod and the bracket, each set being disposed on opposed sides of the muffler, the rod of a given set projecting outwards along a vertical axis of the vehicle and configured to mate with said elastomeric elements.

5. The vehicle of claim 1 wherein the third portion of each rod includes a terminal portion and wherein each terminal portion faces in an opposed direction.

6. The vehicle of claim 1 wherein the bracket is one of welded and bolted to the muffler.

7. The vehicle of claim 1 wherein the second end of the bracket comprises an elastomeric element engaging section.

8. The vehicle of claim 7 wherein the second end of the bracket comprises a generally "V" shaped portion.

9. The vehicle of claim 8 wherein the "V" shaped portion extends from the first end secured to the muffler.

10. The vehicle of claim 9 wherein a leg of the "V" shaped portion forms a heat shield for said elastomeric body.

11. The vehicle of claim 9 wherein a leg of the "V" shaped portion engages the elastomeric body and provides vibration dampening.

12. The vehicle of claim 8 wherein the muffler engaging section comprises a shape complimentary to an outer surface of the muffler.

13. A vehicle comprising a vehicle body frame, at least one seat and an internal combustion engine; an exhaust pipe which is connected to the internal combustion engine through which a combustion gas generated by combustion in the internal combustion engine is exhausted; a muffler connected to the exhaust pipe; a mounting bracket; a heat shield; and a vibration insulator, the muffler having a longitudinal axis, the vibration insulator connecting the muffler to the vehicle, the mounting bracket comprising a unitary rod formed to be of a single body, the rod being attached to said muffler and mated with said vibration insulator, the heat shield having a first end secured to said muffler and a second end engaging said vibration insulator, the rod comprising a first portion secured to the muffler, a first bend, a second portion extending away from the muffler, a second bend, and a third portion which is at least generally parallel to the longitudinal axis of the muffler, and wherein the vibration isolator includes a side surface that faces the muffler and extends substantially parallel to the longitudinal axis of muffler, and the heat shield includes a muffler engaging section and an vibration insulator engaging section, said heat shield further including a first wall extending from said muffler engaging section, a bend, and a second wall opposed to the first wall, the second wall terminating with the vibration insulator engaging section, the vibration insulator engaging section abuts the side surface of the vibration isolator such that the heat shield limits movement of the muffler in a lateral direction that is substantially perpendicular to the longitudinal axis, and further including an opening through which said rod passes.

14. The vehicle of claim 13 wherein the opening in the second wall of the heat shield comprises a notch.

15. The vehicle of claim 13 wherein the first wall of the heat shield and the second wall of the heat shield are of substantially equal lengths and wherein the second wall of the heat shield has a width greater than a width of the first wall of the heat shield.

16. A vehicle comprising a vehicle body frame, at least one seat and an internal combustion engine; an exhaust pipe which is connected to the internal combustion engine through which a combustion gas generated by combustion in the internal combustion engine is exhausted; and a muffler connected to the exhaust pipe, wherein the muffler is attached to the frame by a mounting structure, the mounting structure comprising an elastomeric element configured to be mounted to said frame, a unitary rod formed to be of a single body, the rod being attached to said muffler and configured to mate with said elastomeric element, and a bracket having a first end secured to said muffler and a second end in a facing orientation relative to said elastomeric element; wherein the bracket forms a heat shield comprising a body including a first curved portion, a second substantially planar intermediate portion, a corner providing a bend in said body of at least 120°, and a third substantially planar heat shield portion, wherein said intermediate portion faces said heat shield portion, the third substantially planar portion extends from the corner and terminates at a cantilevered end that is spaced from the corner, and the corner portion resiliently connects the third substantially planar portion to the second substantially planar portion such that the cantilevered end of the third substantially planar portion resiliently deflects relative to the second substantially planar portion.

17. The vehicle of claim 16 wherein the heat shield is manufactured from a flexible, heat resistant material.

18. The vehicle of claim 16 wherein the intermediate portion and the heat shield portion are of about equal length and the heat shield portion has a width greater than a width of the intermediate portion.

19. The vehicle of claim 16 wherein the bracket second end includes at least one of a notched edge and a hole.

* * * * *